(12) United States Patent
Joshi et al.

(10) Patent No.: US 10,292,067 B2
(45) Date of Patent: May 14, 2019

(54) COLLABORATIVE SCHEDULING OF LAST HOP CELLULAR TRAFFIC

(71) Applicant: AT&T Intellectual Property I, LP, Atlanta, GA (US)

(72) Inventors: Kaustubh Joshi, Scotch Plain, NJ (US); Rajesh Krishna Panta, Bridgewater, NJ (US); Cong Shi, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 501 days.

(21) Appl. No.: 14/089,292

(22) Filed: Nov. 25, 2013

(65) Prior Publication Data

US 2015/0146611 A1    May 28, 2015

(51) Int. Cl.
*H04W 28/02* (2009.01)
*H04W 4/24* (2018.01)
(Continued)

(52) U.S. Cl.
CPC ..... *H04W 28/0231* (2013.01); *H04L 41/5029* (2013.01); *H04W 4/24* (2013.01);
(Continued)

(58) Field of Classification Search
USPC ....... 370/328, 229, 230, 235, 236, 237, 238, 370/395.21, 395.43
See application file for complete search history.

(56) References Cited

U.S. PATENT DOCUMENTS

| | | |
|---|---|---|
| 5,812,935 A | 9/1998 | Kay |
| 6,125,109 A | 9/2000 | Fuerter |

(Continued)

FOREIGN PATENT DOCUMENTS

| | | |
|---|---|---|
| AU | 2004208744 A8 | 8/2004 |
| EP | 224586 B1 | 6/1986 |

(Continued)

OTHER PUBLICATIONS

Wayback machine, Wikipedia entry for Estimation theory, Aug. 15, 2013, online (web.archive.org/web/20130815221500/http://en.wikipedia.org/wiki/Estimation_theory), whole document.*
Barzegar, "Multicast scheduling for streaming video in single frequency networks". KTH, School of Electrical Engineering EES Examensarbete / Masters Thesis; XR-EE-LCN 2011:010, 2011, 67 pages.
Piro, et al., "Two-level downlink scheduling for real-time multimedia services in LTE networks." Multimedia, IEEE Transactions, vol. 13, Issue 5, May 10, 2011, pp. 1052-1065.

(Continued)

*Primary Examiner* — Hanh N Nguyen
*Assistant Examiner* — Jose L Perez
(74) *Attorney, Agent, or Firm* — Amin, Turocy & Watson, LLP

(57) ABSTRACT

An eNodeB or other cell access point device can receive demand data from mobile devices served by the cell. The demand data can represent an estimate of demand over a future period for network resources (e.g., bandwidth). The cell can aggregate this demand data and determine price data for the time period or for various intervals of the time period, then transmit the price data to the mobile devices. The price data can operate as a collaborative approach to scheduling traffic. For example, data (e.g., delay tolerant data) can be shifted (e.g., delayed for a few seconds) based on an examination of the price data in conjunction a determined priority of the data. Such can be applicable to data traffic not traditionally thought of as delay tolerant such as streaming video or web browsing, and can be accomplished without negatively impacting the quality of service or experience of the client.

20 Claims, 11 Drawing Sheets

(51) Int. Cl.
  *H04L 12/24* (2006.01)
  *H04M 15/00* (2006.01)
  *H04L 12/14* (2006.01)

(52) U.S. Cl.
  CPC ..... *H04L 12/1435* (2013.01); *H04M 15/8016* (2013.01); *H04M 15/8022* (2013.01); *H04M 15/8027* (2013.01)

(56) References Cited

U.S. PATENT DOCUMENTS

| | | | |
|---|---|---|---|
| 6,658,269 B1 | 12/2003 | Golemon et al. | |
| 7,173,484 B2 | 2/2007 | Rabinovich et al. | |
| 7,248,841 B2 | 7/2007 | Agee et al. | |
| 7,519,323 B2 | 4/2009 | Mohebbi | |
| 7,558,589 B2 | 7/2009 | Harris et al. | |
| 7,649,931 B1 | 1/2010 | Anvari | |
| 7,719,987 B2 | 5/2010 | Kobayashi et al. | |
| 7,729,420 B1 | 6/2010 | Anvari | |
| 7,787,437 B2 | 8/2010 | Sakoda | |
| 8,059,742 B2 | 11/2011 | Kruse | |
| 8,107,375 B1* | 1/2012 | Wong | H04L 41/0896 370/232 |
| 8,331,217 B2 | 12/2012 | Celebi et al. | |
| 8,331,241 B2 | 12/2012 | Nishimura | |
| 8,437,712 B2 | 5/2013 | Melis et al. | |
| 8,473,992 B2* | 6/2013 | Nakano | H04L 45/24 370/229 |
| 8,516,146 B1 | 8/2013 | Yen | |
| 9,104,964 B1* | 8/2015 | Siddiqui | G06F 3/0652 |
| 9,154,225 B2* | 10/2015 | Smith | H04B 10/0775 |
| 2004/0010592 A1* | 1/2004 | Carver | H04L 47/10 709/226 |
| 2006/0172781 A1 | 8/2006 | Mohebbi | |
| 2007/0254628 A1* | 11/2007 | Rybak | H04L 12/14 455/405 |
| 2010/0267403 A1* | 10/2010 | Lungaro | H04L 67/2847 455/466 |
| 2012/0157038 A1* | 6/2012 | Menezes | H04W 4/26 455/405 |
| 2012/0166079 A1* | 6/2012 | Tornkvist | G06Q 30/0202 701/439 |
| 2013/0012160 A1* | 1/2013 | Rubin | H04L 47/14 455/406 |
| 2013/0128744 A1 | 5/2013 | Landais et al. | |
| 2013/0159150 A1* | 6/2013 | Hao | G06Q 10/06 705/30 |
| 2013/0198608 A1* | 8/2013 | Krassner | G06F 17/2247 715/234 |
| 2013/0322329 A1* | 12/2013 | Visuri | H04W 48/16 370/328 |
| 2014/0006237 A1* | 1/2014 | Chiang | G06Q 30/04 705/34 |
| 2014/0094140 A1* | 4/2014 | Misra | H04W 76/15 455/407 |
| 2014/0140329 A1* | 5/2014 | Chetlur | H04L 5/0085 370/336 |
| 2014/0141793 A1* | 5/2014 | Bello | H04W 28/20 455/452.2 |
| 2014/0179265 A1* | 6/2014 | Bruns | H04L 12/1492 455/406 |
| 2014/0295789 A1* | 10/2014 | Devi | H04W 72/1263 455/406 |
| 2015/0063106 A1* | 3/2015 | Devi | H04L 47/19 370/235 |

FOREIGN PATENT DOCUMENTS

| | | |
|---|---|---|
| EP | 1916780 A2 | 4/2008 |
| WO | 9839856 A1 | 9/1998 |
| WO | 2002011301 A2 | 2/2002 |
| WO | 2013106675 A1 | 7/2013 |

OTHER PUBLICATIONS

Karimi, et al., "Power Efficient High Quality Multimedia Multicast in LTE Wireless Networks." Mobile Adhoc and Sensor Systems (MASS), 2011 8th IEEE International Conference on Mobile Ad-Hoc and Sensor Systems; Oct. 17-22, 2011, pp. 161-163.

Lizos, et al., "A novel packet scheduling for high speed bursty traffic in LTE based-3G concepts." Wireless Communications and Mobile Computing Conference (IWCMC), 2012 8th International. IEEE, Aug. 27-31, 2012, pp. 671-676.

Mushtaq, et al., "QoS-Aware LTE Downlink Scheduler for VoIP in Relation With Power Saving." Linkoping University Electronic Press, 2011, 51 pages.

* cited by examiner

EXAMPLE DEMAND DATA 104₁

| 10 | 10 | 10 | 10 | 8 | 2 | 5 | 3 | 1 | 4 |
|---|---|---|---|---|---|---|---|---|---|

404 — EXAMPLE INTERVAL (e.g., 2 seconds)

402 — EXAMPLE DEFINED PERIOD (e.g., 20 seconds)

EXAMPLE DEMAND DATA 104₂

| 3 | 1 | 4 | 10 | 10 | 10 | 10 | 8 | 2 | 5 |
|---|---|---|---|---|---|---|---|---|---|

EXAMPLE AGGREGATE DEMAND DATA 110

| 13 | 11 | 14 | 20 | 18 | 12 | 15 | 11 | 3 | 9 |
|---|---|---|---|---|---|---|---|---|---|

\* AVERAGE DEMAND = 12.6

EXAMPLE PRICE DATA 112

| $f(13)$ | $f(11)$ | $f(14)$ | $f(20)$ | $f(18)$ | $f(12)$ | $f(15)$ | $f(11)$ | $f(3)$ | $f(9)$ |
|---|---|---|---|---|---|---|---|---|---|

- At the fourth interval (circled), price is high, but priority is likely low.
- An incentive exists to shift data traffic from this interval.
- In this example, 6 units of demand are shifted (e.g., delayed); realized in data traffic below
- Those 6 units are added piecemeal to intervals 8-10, but could be shifted to another period.

COLLABORATIVE SCHEDULING OF LAST HOP CELLULAR TRAFFIC

TECHNICAL FIELD

The present application relates generally to reducing peak traffic condition over short-term periods based on collaborative scheduling and/or shifting (e.g., delaying or advancing) traffic to smooth peaks or troughs of traffic throughput.

BACKGROUND

Rapid proliferation of smartphones, tablets, and mobile applications has led to a tremendous increase in mobile data traffic in the last few years. For example, mobile data traffic on major mobile carriers in the United States has increased by more than 20,000% in five years. Furthermore, according to forecasts by major equipment manufacturers, this trend is likely to continue in future with a 78% compound annual growth rate. In contrast, with regulations and other constraints, the capacity of cellular networks, especially the wireless spectrum, has not increased proportionally.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
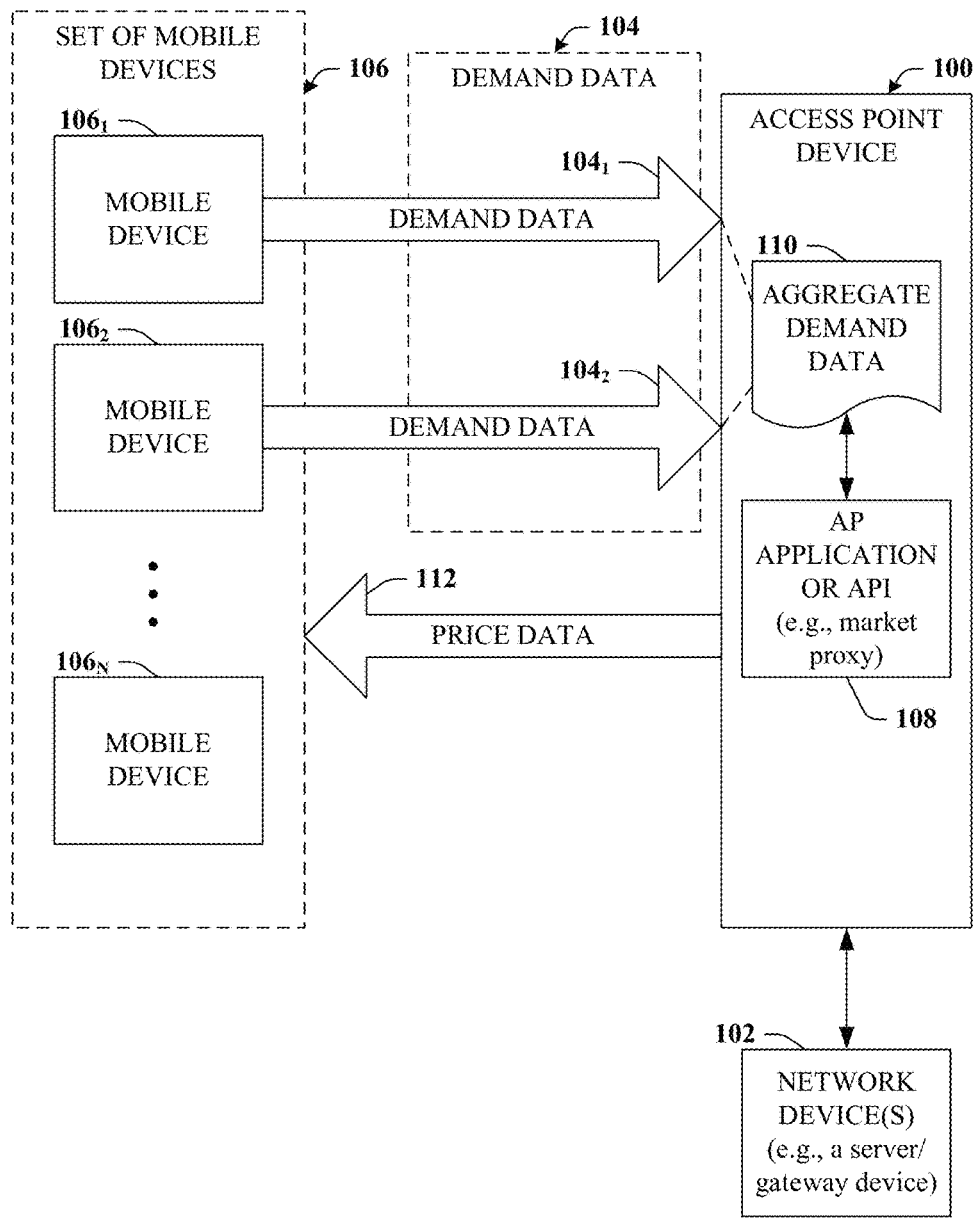
FIG. 1 illustrates a block diagram of an example access point device that can provide for a collaborative approach for determining a network cost of data traffic at specific time periods in accordance with certain embodiments of this disclosure.

The explosive growth of mobile data traffic poses severe pressure on cellular providers to better manage their finite spectrum. Proposed solutions such as congestion-pricing exist, but they degrade users' ability to use the network when they want. The disclosed subject matter proposes a fundamentally different approach. For example, rather than reducing the aggregate busy hour traffic, peaks that cause congestion (potentially very short-term peaks expressed in seconds) can be smoothed. In some embodiments, an approach can be based on two significant insights obtained from traffic traces of a large cellular provider. First, that mobile traffic demonstrates high short-term variation so that delaying traffic for very short periods of time can significantly reduce peaks. Second, by making collaborative decisions on which traffic is delayed and by how much across all users of a cell (e.g., an access point such as an eNodeB), the delays need not result in any degradation of user experience. The subject matter disclosed herein can implement this approach using three key mechanisms: a protocol to allow mobile applications and providers to exchange traffic information, an incentive mechanism to incentivize mobile applications to collaboratively shift or delay traffic at the right time, and mechanisms to delay application traffic. Evaluation indicates the disclosed subject matter can reduce traffic peaks by 50% or more even for applications that are not thought to be delay-tolerant, e.g., video streaming and web browsing, but which together account for 70% of all cellular traffic.

The rapid proliferation of smartphones, tablets, and mobile applications has led to a tremendous increase in mobile data traffic in the last few years. For example, the mobile data traffic on major mobile carriers in the United States has increased by more than 20,000% in five years. Furthermore, according to forecasts by major equipment manufacturers, this trend is likely to continue in future with 78% compound annual growth rate. In contrast, the capacity of cellular networks, especially the wireless spectrum, has not increased proportionally. Efficient management of the mobile traffic is, therefore, important for cellular network operators.

Various solutions have been proposed to manage the mismatch between the ever-increasing traffic demand and finite wireless spectrum. These solutions can be broadly classified into two categories—adding more network resources to increase the overall capacity (e.g., increasing supply), or managing user demands and behavior to reduce the load on the network (e.g., controlling demand). Examples of the first category comprise the use of small cells for augmenting the capacity of traditional macro cells, adding Wi-Fi hotspots to offload cellular traffic to Wi-Fi, using portable base stations (e.g., Cells On Wheels or COWs) to meet high traffic demands in event venues where a large number of users gather for some time, etc. Examples of the second category comprise congestion pricing, off-peak delivery, network-aware throttling, etc. These approaches reduce the aggregate traffic during busy periods by either shifting the parts of traffic that can tolerate some delay to off-peak hours (e.g., backup, synchronization, cloud offload, etc.) or encouraging or forcing users to use the network less frequently.

These existing approaches have some fundamental limitations. Shifting traffic to off-peak hours can cause degradation of quality of service experienced by the end users. The vast majority of mobile data traffic, including video streaming and mobile web browsing, cannot be shifted to off-peak hours because of latency requirements. Although additional network resources increase the overall capacity, they also incur significant costs. Furthermore, solutions like small cells can be deployed only gradually because of the detail radio engineering trials required for the correct positioning and deployment of such infrastructure.

The disclosed subject matter focuses on a fundamentally different approach to resolve these issues—delaying mobile traffic like video streaming and mobile web browsing that are not traditionally thought to be delay tolerant. This is based on two significant insights derived from mobile traffic traces of a large US cellular provider. First, it is observed that the mobile data traffic exhibits high "burstiness" over small time scales (tens of seconds). Thus, to ensure adequate quality of service at all times, it can be more meaningful to reduce the instantaneous peak traffic, instead of aggregate traffic. Second, even applications like video streaming and mobile web browsing, can, in fact, tolerate small delays. For example, a video streaming client can tolerate delays of a few seconds as long as its playback buffer is not empty. Mobile web browsers can delay downloading the contents that are not currently displayed on the screen. These two insights suggest that if the right user traffic (from the set of all current user traffic in the cell) is delayed at the right time for the right time duration, it is possible to reduce the peak traffic in a cell without affecting the user experience on any mobile device. Such can be accomplished by leveraging both device-level information (e.g., tolerable delay values at the given time instant) and cell-level information (e.g., the total traffic demand in the cell at the given time instant). Thus, an efficient interaction mechanism between mobile devices and cellular infrastructure can be provided to enable collaboration to make proper decisions about delaying the user traffic.

Leveraging these insights, various designs, implementation, and evaluation of the disclosed subject matter are presented herein. The disclosed subject matter can provide an interface to enable an efficient collaboration between mobile devices and the network element to which they are connected (e.g., a base station). The interface can be simple and flexible, allowing dynamic policies and protocols to be built on top of it, according to the requirements and capabilities of individual mobile applications. The disclosed subject matter can also provide an incentive mechanism for mobile applications to delay their traffic and the actual mechanisms to delay the application traffic.

In summary, the disclosed subject matter can provide numerous advantageous. As a first example, rather than reducing the aggregate busy hour traffic, instantaneous peak load in a cell can be reduced, without compromising the quality of service experienced by the end users. As a second example advantage, no changes to Internet servers, 3GPP cellular network standards, or core networking protocols like TCP are required. Such can help in quick and easy adoption of the proposed techniques. As a third example advantage, the disclosed subject matter can delay or shift traffic which is not traditionally thought to be delay tolerant. As a fourth example, unlike existing solutions that add more resources, no additional resources are necessary and no such additional deployment costs need be incurred. As a fifth example advantage, the disclosed subject matter can provide a simple and flexible interface for mobile devices and the cellular network to exchange various information to enable them to make proper decisions about delaying user traffic.

Collaborative Scheduling Based on Price Data

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, access point device 100 is depicted. Access point device 100 can provide for a collaborative approach for determining a network cost of data traffic at specific time periods. Generally, access point device 100 can comprise a memory to store instructions and, coupled to the memory, a processor that facilitates execution of the instructions to perform operations. Examples of the memory and processor can be found with reference to FIG. 11. It is to be appreciated that the computer 1102 can represent a service device of a communications network or a user equipment device and can be used in connection with implementing one or more of the systems or components shown and described in connection with FIG. 1 and other figures disclosed herein.

In particular, access point device 100 can provide a set of mobile device $106_1$-$106_N$ access to network device(s) 102. Access point device 100 can be any suitable device such as an eNodeB, NodeB, etc. The set of mobile devices $106_1$-$106_N$ can comprise substantially any number, N, of individual mobile devices $106_1$-$106_N$, which are hereinafter referred to, either individually or collectively, as mobile device(s) 106, with appropriate subscripts generally employed only when instructive or convenient to highlight various distinctions or to better impart the disclosed concepts. Network device 102 can be a server or gateway device, typically residing in a core network portion of the communication network.

Access point device 100 can be configured to receive demand data 104 from all or a portion of the set of mobile devices 106. Such can be accomplished by an application or application program interface (API) 108 that executes at access point device 100. API 108 can be referred to herein as a "market proxy," which is further detailed infra. In this example, access point device 100 receives demand data $104_1$ from mobile device $106_1$ and demand data $104_2$ from mobile device $106_2$, however it is understood that demand data 104 can be received from any subset of set of mobile devices 106. Demand data 104 can be a demand vector and can represent an estimated demand for a network resource (e.g., bandwidth) over a defined period. Typically, this defined period will be a relatively short-term period on the order of seconds instead of minutes or hours, which is further detailed below. For example, research has found that 20 seconds can be an effective length of time for the defined period, however, the period can be modified to suit a particular application. Thus, in some embodiments, the defined period can be five seconds or even shorter, while in other embodiments, the defined period up to a minute or more.

Demand data 104 from multiple mobile devices can be aggregated, which is represented as aggregate demand data 110. Access point device 100 can be configured to determine price data 112 of the network resource over the defined period. Price data 112 can be determined based on the aggregate demand 110, and therefore implicitly captures an element of collaboration that is lacking in other solutions.

Access point device 100 can be configured to transmit price data 112 to all or a portion of the set of mobile device 112. As is further detailed with reference to FIG. 5, mobile devices 106 can utilize price data 112 to optimize or improve throughput of data traffic. In particular, data traffic can be delayed, advanced, or otherwise shifted to another time based on price data 112. For example, data demanded by mobile device 106 during a time of high short-term price can be delayed, which can result in smoothing short-term traffic spikes. Such can be particularly effective because a significant proportion of congestion is caused by short-term traffic bursts that trigger throttling or other remedial mechanisms that ultimately have a negative cascading effect on network performance. However, by smoothing traffic such that spikes do not occur, occur less frequently, or are reduced in magnitude, networks can operate at much greater throughput and efficiency.

Thus, in some embodiments, an object of the disclosed subject matter is to reduce the peak-to-average ratio of the cellular last hop traffic. This disclosure primarily focuses on downstream traffic as the upstream traffic intensity is not as significant. However, it is understood that the same or similar techniques can be employed for upstream traffic as well. Reducing the peak-to-average ratio can be accomplished by shifting or delaying traffic at times when the link is experiencing heavy load. Acceptable delays in theses case are from a few to 10s of seconds depending on the applications. As is detailed below, such relatively short traffic delays are enough to produce the desired effect of reducing traffic peaks. It is understood that it is possible to shift or delay traffic without negatively impacting user experience. In fact, user experience might be enhanced, as a broad result of the techniques detailed herein can reduce congestion or other eventualities that might negatively impact the user experience.

It is underscored that price data 112 or any disclosed pricing scheme is, strictly speaking, internal to the system and is used to facilitate decision making. It is not necessarily meant to be exposed directly and as-is to the user, or is it necessarily meant to translate directly into billing. Rather, price data 112 can be utilized to incentivize users (e.g., customers, app designers, etc.) to deploy the disclosed techniques. Therefore, some correlation between billing and plan pricing practices of operators might occur or might be influenced by the usage of the disclosed subject matter. However, the actual implementation can be a business decision, while technical aims discussed focus more on preserving the user experience so that a user should not notice any difference in performance.

Effective operation if more favorable if most UEs on the same last hop link use the disclosed subject matter, yet it is noted that it is not necessary that all users do so, but rather, just enough to make a difference in traffic peaks. Also note that users not deploying the disclosed subject matter will not necessarily see an advantage (since the user experience is preserved for those using it). So there is no individual incentive to "cheat" the system in this case. On the contrary, users will be interested to participate if operator pricing does somehow reflect the usage of the system. It is anticipated that the user portion of the system will be deployed within the operating system of the mobile device and managed by the operator making it more difficult to circumvent.

Figure 2:
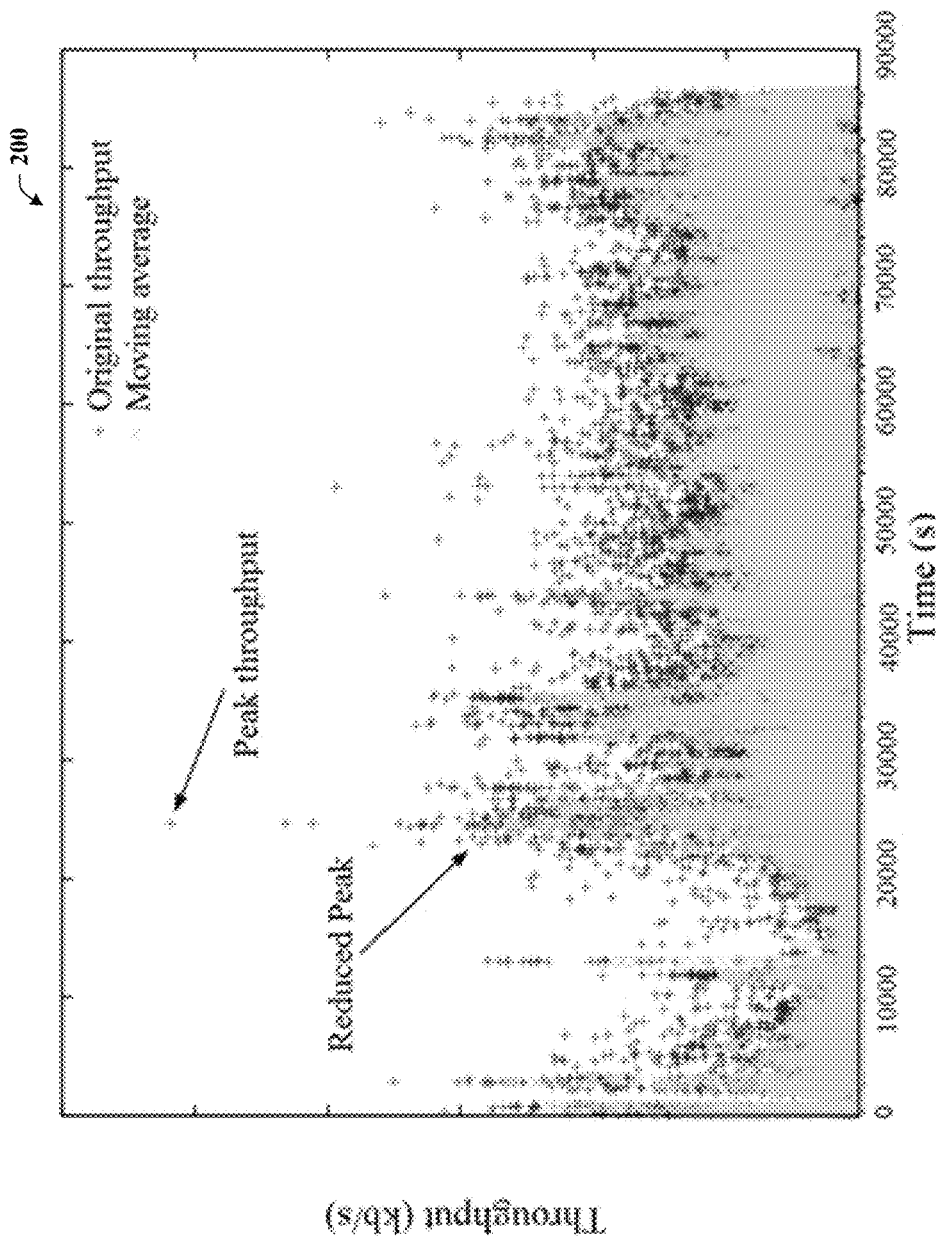
FIG. 2 illustrates an example of downlink throughput of an example cell over a day along with a 20 second moving average of the throughput in accordance with certain embodiments of this disclosure.

While still referring to FIG. 1, but turning now as well to FIG. 2, illustration 200 is depicted. Illustration 200 plots downlink throughput of an example cell over a day along with a 20 second moving average of the throughput. Illustration 200 provides a view of the traffic distribution on cells using a large dataset of cellular traffic which is decomposed by radio network controller (RNC), by Node-B within each RNC, and by mobile within each cell, totaling 13,522 Node-Bs. Here, the focus on the downlink traffic because it is significantly larger than uplink traffic in cellular networks. The data in this example, show that the mobile data traffic of a typical cell demonstrates high variations over short time scales (e.g. 30 seconds). The traffic is clearly very bursty with large short-term variations. To ensure adequate quality of service at all times, the cellular network provider generally need to over-provision the network resources based on the peak traffic demand. Therefore, the burstiness of mobile traffic makes the resources underutilized during most periods of time.

A heuristic idea to better utilize the cellular resources is to delay a portion of mobile traffic for a short period of time to reduce the peak throughput over time. As a simple approximation, we use the moving average in a short period of time to demonstrate the potential benefits of delaying mobile traffic. Illustration 200 shows that the peak value of the 20 second moving average (e.g., the "reduced peak") is only about 60% of the original denoted peak throughput. This implies that delaying a portion of mobile traffic by 20 seconds or less can result in a significant reduction in the peak throughput demand in the cell. Such can yield two significant benefits. First, reducing the peak throughput allows the network to support more users and mobile traffic without upgrading the infrastructure. Second, this also reduces congestion and helps improve the performance of mobile applications that are sensitive to delays (e.g., VoIP).

Figure 3:
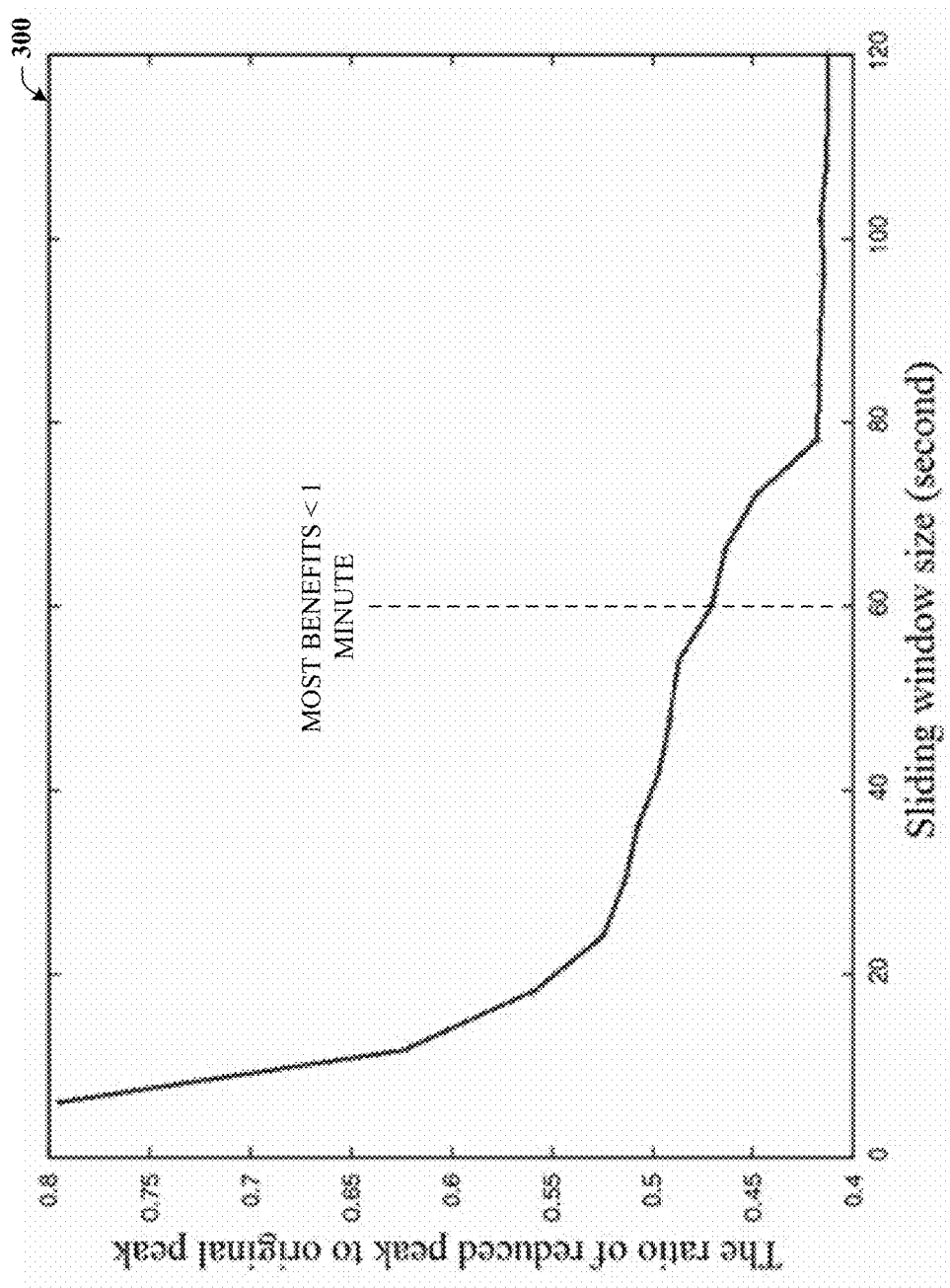
FIG. 3 illustrates an example graph of a ratio of peak reduction over a window size in seconds in accordance with certain embodiments of this disclosure.

While still referring to FIGS. 1 and 2, but turning now as well to FIG. 3, illustration 300 is depicted. Illustration 300 provides graph of a ratio of peak reduction over a window size in seconds. To further quantify the relationship between the extra delay and the reduction on the peak throughput, we compare the reduced peak throughput achieved by moving averages computed over different time intervals for heavily-loaded cells. As can be seen, when the window size increases from 1s to 30s, the reduced peak throughput quickly decreases. As the window size further increases to 100s, the peak is gradually reduced. Illustration 300 therefore implies that most benefits in terms of reduction of peak throughput can be obtained by delaying traffic for short time durations (e.g., 30 seconds, with most benefits occurring when less than 60 seconds), with diminishing returns for larger delay intervals.

Figure 4:
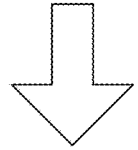
FIG. 4 illustrates a block diagram of various example relationships between demand data, aggregate demand data, price data as well as optional intervals for these data in accordance with certain embodiments of this disclosure.

With reference now to FIG. 4, diagram 400 illustrates various relationships between demand data, aggregate demand data, price data as well as optional intervals for these data. As detailed in connection with FIG. 1, access point device 100 can receive demand data 104 from multiple mobile devices 106 served by access point device 100. This demand data $104_1$ can represent data the mobile device $106_1$ expects to send or receive or a defined period 402, in this case over some subsequent 20-second period. Likewise, access point device 100 can also receive similar demand data $104_2$ from mobile device $106_2$. Although such is the case in this example, these 20-second periods are not required to be identical, but will typically overlap to a degree and will typically be updated periodically by new demand data (e.g., new, potentially overlapping demand data 104 every 2 seconds, every 5 seconds, etc.).

In some embodiments, demand data 104 can comprise a set of demand values that correspond to intervals 404 of defined period 402. In this case, there are ten intervals 404, each two seconds in length, however, it is understood that substantially any number (or none) of intervals 404 can exist. It is further understood that values associated with demand data 104 (or separate intervals 404) can be indicative of demand during that time, as determined by mobile device 106. Here, the demand is displayed as a value from 1-10, where 10 represents high demand, but it is understood that any suitable indicator, including data size request, bitrate values, etc. can be employed.

In this example, it is assumed that both instances of demand data $104_1$ and $104_2$ reflect requests from a streaming video application executing on the associated mobile device 106. In the case of demand data $104_1$, the request initiates at the beginning of defined period 402, as evidenced by the high demand (e.g., value=10) estimated for the first four intervals 404 that will be used to cache or buffer data associated with video playback is being filled. In the case of demand data $104_2$, the request initiated somewhat later.

Access point device 100 can aggregate all available demand schedules (e.g., demand data 104) to construct aggregate demand data 110, which depicts aggregate demand. Thereafter, price data 112 can be constructed as a function of the aggregate demand 110. Price data 112 does not necessarily reflect a price for the data or bandwidth use during the associated time, but it can be used, or represent and incentive to be used, by mobile devices 106 to collaboratively avoid behavior that results in traffic bursts that degrade network performance, which is further detailed with reference to FIG. 5-6B. For example, mobile device 106 can utilize price data 112 to shift or delay scheduled traffic in a manner that reduces bursts or peaks such that traffic throughput ultimately more closely resembles the smooth moving average plot illustrated at FIG. 2. Furthermore, price data 112 can be used to incentivize users to respond to price in a productive manner. For instance, consider a provisioned service that allows X MB of data each month or other provision period. In some embodiments, an accounting system might receive usage values representing a total amount of data transferred over an accounting period (e.g., for the full month). Data in this case is not charged per MB, but since there is still a budget for maximal data within the accounting period (e.g., X), price data 112 can still provide an incentive. For example, data received at a low price can be accounted for based on a reduction, e.g., 1 MB communicated at a preferred price (that is below a defined price threshold and/or below an average throughput value over an associated period) might only be accounted as 0.5 MB or 0.8 MB, or some other discount. Such incentives might operate to reduce traffic when aggregate demand is high (e.g., delay streaming video packets when the buffer is not empty) or to encourage traffic while demand is low (e.g., perform a cloud backup operation early, since prices are currently low).

As illustrated, in embodiments where intervals exist, aggregate demand data 110 and price data 112 can comprise a set of demand values and prices, respectively that correspond to the intervals 404 of the defined period 402. It is also understood that distinct demand data 104, aggregate demand data 110, and/or price data 112, can exist for uplink communications and downlink communications. Also illustrated is an average demand, which can be determined by access point device 100. In this case, the average demand is a mean average over defined period 402 of 12.6, yet it is understood that such might be other values such as a moving average or the like, and such can be but is not limited to being an average over the defined period 402. This average demand value can be employed in connection with determining price data 112. For example, access point device 100 (or application/API 108) can determine price data 112 by determining the price of an interval 404 of defined period 402 based on a difference between aggregate demand data 110 during the associated interval 404 and a determined average demand over defined period 402.

Shifting Data Traffic Based on Price Data

Figure 5:
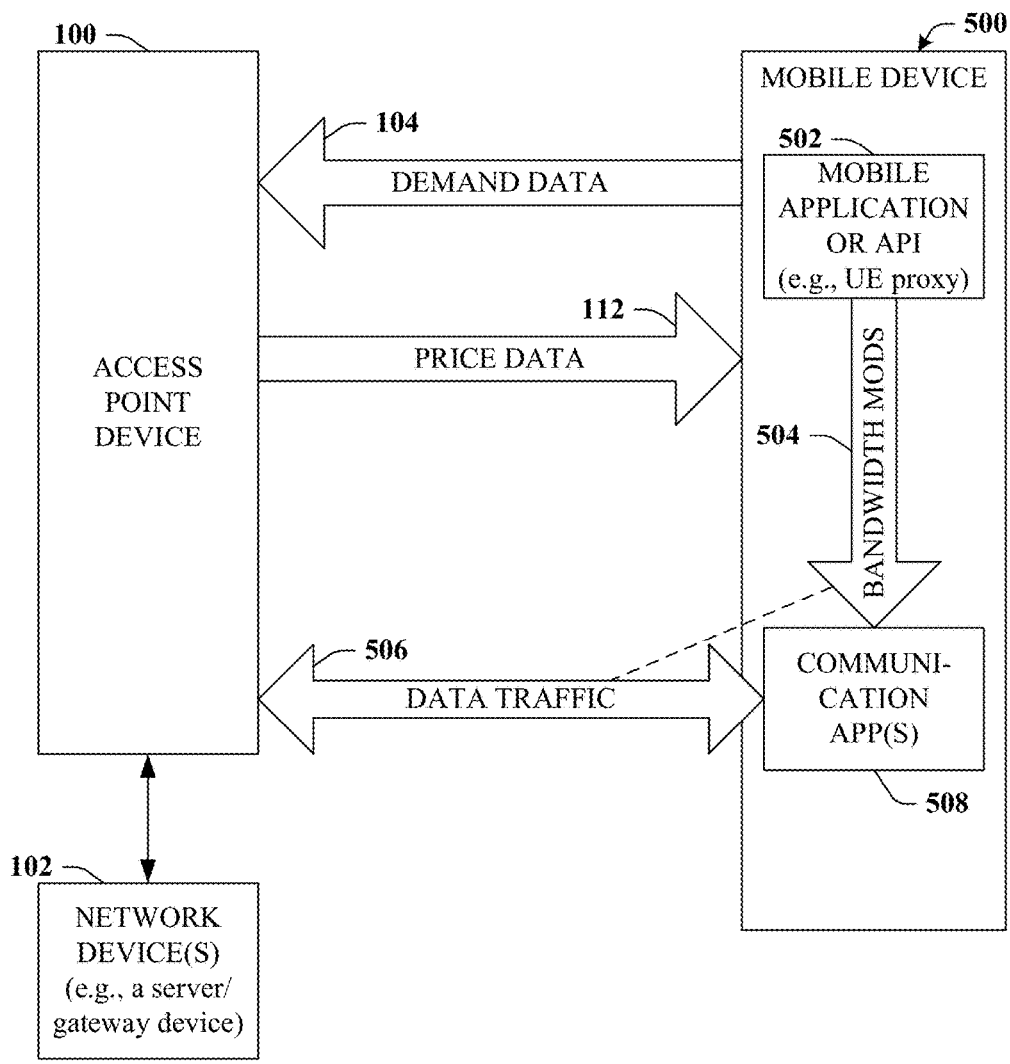
FIG. 5 illustrates a block diagram of an example mobile device that can provide for utilizing collaborative price data for modifying data traffic in accordance with certain embodiments of this disclosure.

Referring now to FIG. 5, mobile device 500 is depicted. Mobile device 500 provides for utilizing collaborative price data for modifying data traffic. Mobile device 500 can be, or can be substantially similar to, mobile devices 106 detailed in connection with FIG. 1. Mobile device 500 can be configured to transmit demand data 104 representing an estimate of bandwidth demand by mobile device 500 over a defined period (e.g., defined period 402). Demand data 104 can be provided to access point device 100 (e.g., an eNodeB, or another suitable base station or cell) that provides access to network device 102 of a communication network.

Mobile device 500 can be configured to receive from access point device 100 price data 112 representing a price of bandwidth usage over the defined period 402. Based on price data 112, mobile application or API 502 can determine advantageous bandwidth modification(s) 504. API 502 can be referred to herein as a "UE proxy," which is further detailed below. Such can be accomplished (detailed infra) by modifying actual bandwidth utilization and/or actual data traffic 506 relative to the estimated demand 104 that was previously provided to access point device 100 and used to determine price data 112. In some embodiments, such can be accomplished by working with various communication apps 508 executing on mobile device (e.g., streaming video player apps, browsing apps, etc.). Additionally or alternatively, the communication apps 508 might determine and/or control bandwidth modification(s) 504, in which case mobile application or API 502 might simply provide price data 112 to the app(s) 508. Regardless, an objective of the disclosed subject matter is to delay or otherwise shift data traffic 506 in order to, e.g., reduce short-term bursts of traffic, which can be effectuated by responding to price data 112, which is further discussed in connection with FIG. 6A.

Figure 6A:
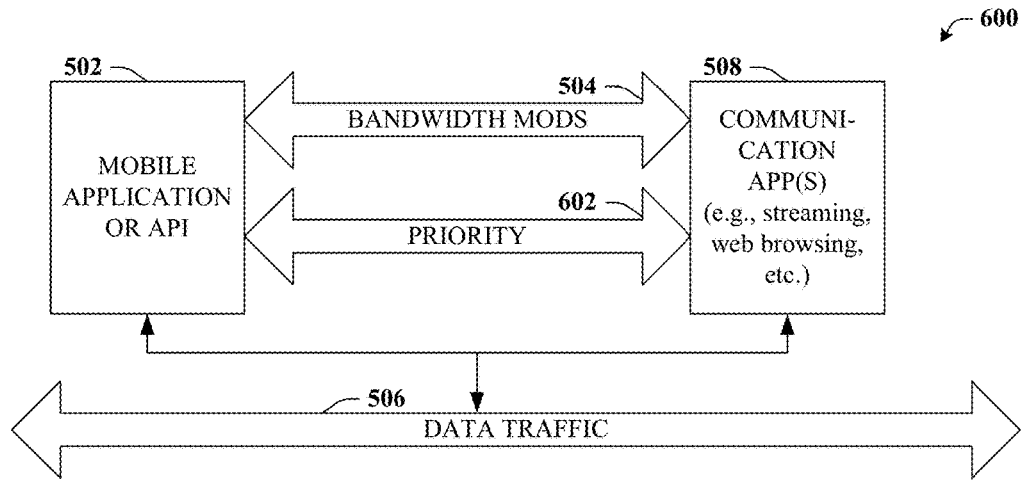
FIG. 6A illustrates a block diagram of an example system for determining a priority of data traffic in accordance with certain embodiments of this disclosure.

Turning now to FIG. 6A, system 600 is depicted. System 600 can provide for determining a priority of data traffic. Regardless of the implementation, mobile application or API 502 can communicate with communication app(s) 508. Together, these two elements 502, 508 can determine advantageous bandwidth modification(s) 504 that affect data traffic 506. In some embodiments, elements 502, 508 can determine priority 602. Priority 602 can represent a level of importance associated with data traffic 506 and/or the estimated bandwidth demand 104.

As was discussed, it has been observed that data traffic traditionally believed to be intolerant to delays (e.g., streaming video, web browsing) actually does provide opportunities for intelligent delay tolerance without degrading the user experience. Therefore, applications associated with such can intelligently shift or delay traffic (e.g., via bandwidth modification(s) 504) without affecting expectations.

In more detail, streaming applications (e.g., video streaming, audio streaming) account for around 34% of the total mobile traffic. As these streaming applications usually buffer some data, they can tolerate small delays that are less than or equivalent to the current buffer occupancy of the playback buffer.

Initially, the streaming video client aggressively buffers the video content. But once the client has sufficient content to play for some time, it slows the download to avoid downloading unnecessary contents in case the user does not watch the complete video. The difference between the actual download and the playback progress at any given time can represent the amount of delay the streaming video client can tolerate at that time without affecting the user experience (e.g., interrupting the video playback).

It is noted that depending on the size of the buffered data, the delay that the video client can tolerate varies from few seconds to more than several minutes. In addition, user operations like rewind, fast forward, or other scanning operations might also impact the delay that the video client can tolerate at the specific time. Since accurate information of delay tolerance is available to the video client, delaying the streaming traffic arbitrarily from the network side without taking real time input from the user device, may affect the user experience. Yet such can be avoided by decisions made in conjunction with the streaming video application.

With respect to web browsing applications, these applications are also top generators of cellular mobile traffic. As with video streaming, web browsing is generally not regarded as being delay-tolerant. However, we observe that due to the small form factor or screen size of smartphones and other user equipment, a portion of content of a webpage (e.g., texts, images, and other multimedia contents) are not shown on the screen, but rather are accessed by scrolling the screen. When a user browses a web page, only contents that are shown on the screen need to be downloaded immediately, while off-screen contents can be downloaded a little bit later without impacting the user experience. Therefore, off-screen contents can be treated as delay tolerant. In fact, some websites support progressive download and presentation of the web pages. When web pages contain many multimedia elements (e.g., images), the amount of traffic that can be delayed can be significant.

Generally a significant portion of the web content is off-screen and can tolerate short extra delays. For categories like "News", more than 50% of those websites have more than 50% of the contents that can tolerate extra delay. In addition, since the homepages of the websites usually contain less content than other pages, it is estimated that a significant amount of traffic that arises from web browsing is delay-tolerant. Like streaming applications, we also notice that the web browser can identify which content is off-screen and can identify which content can tolerate short delays, especially in response to inputs relating to scrolling the web page.

Thus, communication app(s) 508 is well suited to determine priority 602 such as assigning a high priority 602 to on-screen content with a lower priority 602 assigned to off-screen content in connection with web browsing. Put another way, when data traffic 506 relates to web browser data, priority 602 can be a function of whether the web browser data comprise a current viewable presentation. Similarly, communication app(s) 508 can assign a high priority 602 to streaming video data when the buffer is empty or nearly empty, yet assign a low priority 602 when the buffer is full or nearly full. Hence, when data traffic 506 relates to streaming video, priority 602 can be a function of a capacity of a data buffer associated with the streaming video data.

Figure 6B:
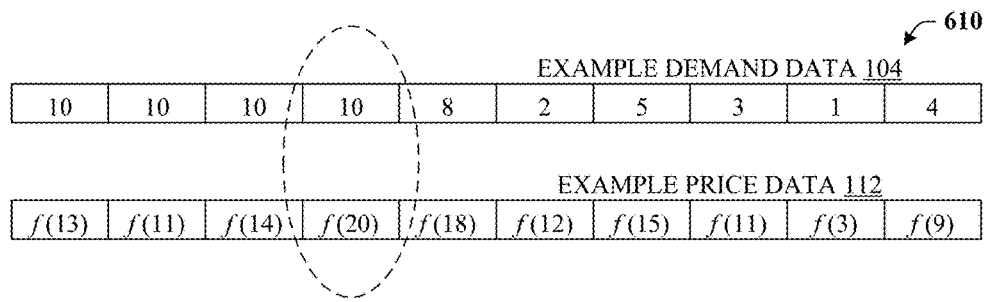
FIG. 6B illustrates a block diagram of an example of shifting data traffic associated with an interval of a defined period to other intervals of the defined period based on the price data in accordance with certain embodiments of this disclosure.
Figure 6B:
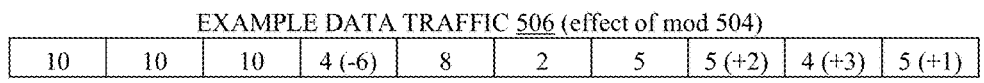

In some embodiments, the modifying bandwidth utilization (e.g., characterized or represented by bandwidth modification(s) 504) can comprise shifting data traffic from an interval (e.g., interval 404) of the defined period (e.g., defined period 402) based on priority 602 of data traffic 506 at an interval price (e.g., price data 112) associated with the interval. In some embodiments, the modifying bandwidth utilization can comprise shifting data traffic 506 to an interval 404 of the defined period 402 based on priority 602 of the data traffic an interval price associated with the interval 404. FIG. 6B provides a non-limiting example.

Referring now to FIG. 6B, diagram 610 is illustrated. Diagram 610 illustrates an example of shifting data traffic associated with an interval of a defined period to other intervals of the defined period based on the price data 112. In this example, the data points discussed at FIG. 4 are again referenced in which demand data 104 relates to a streaming video application. Initially, there is high demand over the first four intervals 404. When combined with demand data 104 from other uses of the cell, price data 112 can be determined and provided to mobile device 500.

At the fourth interval (encircled) demand is very high (e.g., 10), and price also very high (e.g., due to other devices expecting high demand at the same time). However, it is likely that at this interval priority 602 is low. For instance, the previous three intervals, also with high demand, will have likely sufficiently filled the streaming video buffer such that additional buffering can be somewhat delay-tolerant. Moreover, because of the high price at this interval, an incentive exists to shift data traffic 506 from this interval 404.

Referring to the example data traffic 506 element, effects of bandwidth modification(s) 504 can be seen. In this example, six units of demand (e.g., what was estimated in demand data 104) at the fourth interval 404 are shifted in the actual data traffic 506 in response to the bandwidth modification(s) 504. Those six units of demand are added piecemeal to other intervals 404 of the defined period 402. Such can be based on price data 112 associated with the receiving intervals 404. In this case, two units of the six shifted/delayed units are added to the eight interval 404, three units are added to the ninth interval 404, and one unit is added to the tenth interval 404. It is appreciated that this is merely and example to concretely illustrate the disclosed concepts. Such delaying or shifting can be in accordance with optimization algorithms, some of which are further detailed herein.

Example Design Principles

Minimal modification to mobile applications: For ease of deployment, the architecture modification on the server side are not necessary. Small changes on the client side of the mobile applications can be advantageous since the mobile applications have access to the delay constraints of their traffic. In some embodiments, the architecture can modify the socket APIs so that client applications can provide the delay information in a transparent manner.

Privacy preservation: To reduce the peak load on the cell, the architecture can rely on the collaboration and/or sharing of the traffic information among all mobile devices that connect to that cell. To protect the privacy of a mobile device from other participating mobile devices, the control plane of the architecture can be decomposed into UE proxies on mobile devices and a market proxy on an eNodeB or other access point device. In some embodiments, each mobile device shares its aggregated traffic demand only with the market proxy and only obtains the prices from the market proxy, avoiding the direct sharing of traffic demands among participating devices.

Control of Demand through pricing: To motivate mobile applications to delay their traffic when advantageous, the architecture can use dynamic "prices" in charging mobile traffic at different time. The "prices" used by the architecture can directly be price-per-bit. More generally, prices can also be treated as the discount ratio on the accounted traffic. For example, when the price is 0.8, 1 Mbyte of mobile traffic can be accounted as 0.8 Mbytes. In the latter case, it is compatible with the usage-based pricing model used by most cellular providers.

Example Architecture Operation

At a high-level the architecture can consist of multiple primary components. For example, these components can comprise a market proxy that resides on a cell-level network element like eNodeB and a UE proxy on each mobile device and a user library providing simple APIs to applications. In some embodiments, the market proxy collects the traffic demands from all mobile devices that connect to its cell. These demand data are used as parameters of an optimization problem (eOpt) which determines new future prices with the goal of minimizing the traffic peaks. On the user side, applications determine their traffic demands in a manner that satisfies their delay constraints and sends this information to its UE proxy through a user library. The UE proxy uses these demands as inputs to an optimization problem (uOpt) that attempts to minimize the cost of satisfying these demands based on prices determined at the market proxy. The architecture can also comprise a mechanism by which applications can control their traffic according to the outputs of uOpt. Hence, the functionality of the architecture can be divided into a control plane for information exchanges and updates between the UE proxy and the market proxy and a data plane for traffic control.

Example Control Plane

The control plane can be a distributed system consisting of a market proxy and a UE proxy for each user device. One task for the control plane can be to minimize the maximal throughput on a cell sector over time. If we denote the throughput at time, t, of the ith flow in the sector by $th_i(t)$, then the optimization goal can be described as:

$$\min \max(t) \Sigma_{i=1}^{n} th_i(t) \quad (1)$$

A centralized solution to this problem might require the market proxy and the UE proxy to share information about all flows including flows at other sectors. In some embodiments, this violates our privacy preservation design goal and is, therefore, not preferred. To solve the optimization problem without such violation, we use a dual decomposition method in some embodiments to decompose the original problem into a master problem and multiple independent sub-problems. The master problem (e.g., eOpt) can be solved by the market proxy, while the independent sub-problems (e.g., uOpt) can be solved by the UE proxies. We describe this decomposed optimization process next. A formal derivation of this decomposition is shown below.

At a high level, the control plane functions in some embodiments as follows: The market proxy periodically computes the projected prices for mobile traffic for some time window in the future. These prices are calculated based on the traffic demand collected from all or a portion of connected UEs. The prices are broadcast to all or a portion of connected UEs. Each UE proxy uses the price information from the market proxy and the demand information from its mobile applications to schedule the mobile traffic such that the demand of each application is satisfied and the overall cost is minimized. The UE proxy then sends back the traffic demands that it calculates for some future time window to the market proxy, and the process is repeated. It should be noted that it is not necessary to change the control plane of existing 3GPP specifications. The control plane described here is from the perspective of the disclosed architectures. They can belong to a data plane from 3GPP perspective.

Example Market Proxy Operations

In some embodiments, the market proxy operates in time slots with length τ (e.g., 1 second). The time slot that time t belongs to is denoted as $$\lfloor t \rfloor_\tau = \frac{t - t_0}{\tau},$$

where $t_0$ is the start time. Let $p(\lfloor t \rfloor_\tau)$ represent the price for the downlink traffic through a cell c during time slot $\lfloor t \rfloor_\tau$. Let $th_e(\lfloor t \rfloor_\tau)$ represent the downlink traffic demand of UE e during time slot $\lfloor t \rfloor_\tau$.

In every δ seconds (e.g., δ=0.1), the market proxy receives a vector of traffic demand for the next κ (e.g., 30) time slots, e.g., $\overline{th_e} = \{th_e(\lfloor t \rfloor_\tau), th_e(\lfloor t \rfloor_\tau + 1), \ldots, th_e(\lfloor t \rfloor_\tau + \kappa)\}$, where t is the current time. Then it updates the price vector, e.g., $\overline{p} = \{p(\lfloor t \rfloor_\tau), p(\lfloor t \rfloor_\tau + 1) \ldots p(\lfloor t \rfloor_\tau + \kappa)\}$, as follows:

$$\overline{p}' = [\overline{p} + \beta(\Sigma_e \overline{th_e} - \alpha)]_H \quad (2)$$

where $\alpha = \max_t \Sigma_i th_e(t)$, $[\overline{p}]_H$ represents the projection of $\overline{p}$ onto the hyperplane $H = \{p(t) | \Sigma_t p(t) = 1, p(t) \geq 0\}$, and β is the step length. The value of β is set to ensure that ∀t, $|p'(t) - p(t)| < p(t)/10$ in an example implementation. The market proxy broadcasts the prices to UEs connection to the cell.

Example UE Proxy Operations

In some embodiments, the UE proxy collects the information about traffic demand per slot (τ) for κ slots into the future from all mobile applications and periodically receives the future price information from the market proxy. Such can generate the future traffic demand, $\overline{th_e}$, and sends this data to the market proxy.

Each mobile application reports its delay constraints for the next κ time slots to its UE proxy. Let us use <D, t>, e.g., a tuple of the amount of data D and its deadline t, to express the delay constraint that data D should be downloaded before deadline t. Therefore, for a specific flow i, its delay constraints can be expressed as a set of tuples, e.g., $\{<D_{i,0}, t_{i,0}>, <D_{i,1}, t_{i,1}>, \ldots <D_{i,n}, t_{i,n}>\}$, where $t_{i,0} < t_{i,1} < \ldots < t_{i,n}$. Let us define function $d_i(t) = \Sigma_{j=0}^{T} D_{i,j}$, where $t_{i,T} \leq t \leq t_{i,T+1}$. Such can represent the amount of data required to be transferred before time t.

When a UE proxy receives the price information from the market proxy, associated mechanisms attempt to minimize the cost function of transferring data under the constraint that the delay constraints of all flows are satisfied. Specifically, at time t* the UE proxy solves the following optimization function:

$$\min \Sigma_i \Sigma_{t \in T} th_i(t) \times p(t)$$

$$\text{s.t. } \Sigma_i th_i(t) \leq b_d \forall t \in T$$

$$\Sigma_i \Sigma_{t \geq t'} th_i(t) \times \tau \geq d_i(t), \forall t' \in T \quad (3)$$

where $th_i(t)$ is the throughput of downlink flow i at time t, $b_d$ is the downlink bandwidth, and $T = \{\lfloor t^* \rfloor_\tau, \ldots \lfloor t^* \rfloor_\tau + \kappa\}$.

By solving the above optimization function we obtain the desired throughputs of all downlink flows over time. $th_i(\lfloor t^* \rfloor_\tau)$ corresponds to the bandwidth allocated to flow i in the current time slot. In some embodiments, the UE proxy will send this value back to the mobile applications to control their traffic in the data plane accordingly as described infra. It should be noted that those constraints may not be satisfied, e.g., the available bandwidth may be smaller than the traffic demand. Under such a scenario, the architecture can allow mobile applications to transfer data as fast as possible and let users decide if they want to stop some applications.

The UE proxy will also send $\{th_e(t)|th_e(t)=\Sigma_i th_i(t), t \in T\}$ to the market proxy. The market proxy collects such traffic demands from all UEs in the cell and updates the prices in the next round.

Example Data Plane

In some embodiments, the primary functionality of the described data plane is to control the downlink traffic based on the throughput cap assigned by the control plane. As most of the mobile applications we are considering use TCP and we don't want to modify the server, we focus on controlling the TCP traffic from the receiver side. It is also important to note that while the control plane operates with a window of projected demands and prices, the data plane only controls the traffic for the current slot.

In transmission control protocol (TCP) the amount of data that the sender can send within a round trip time (RTT) is limited by min {cwnd, rwnd} where cwnd is the congestion window size, and rwnd is the receiver's window size advertised in the acknowledgement packets. When cwnd is larger than rwnd, rwnd will determine the throughput of a TCP flow. To control the downlink traffic from the receiver side, we set an upper-bound on rwnd as:

$$DL\_CAP = \max\{throughput \times RTT, MSS\} \quad (4)$$

where throughput is the target throughput assigned by the control plane. When the throughput is very small, DL_CAP is set to MSS to avoid totally blocking the flow. In an example implementation, we add a new socket option, DL_CAP, to allow applications to dynamically specify the upper-bound on the advertised receiver's window size at runtime.

It is noteworthy that the receiver can obtain the required downlink throughput after one RTT since the sender receives the new advertised rwnd after RTT/2 and then spends RTT/2 to deliver the new packets to the receiver. When RTT is large (e.g., 1 second), the receiver should use the estimated future throughput to set DL_CAP.

Methods for Organizing Traffic Based on Price Data

Figure 7:
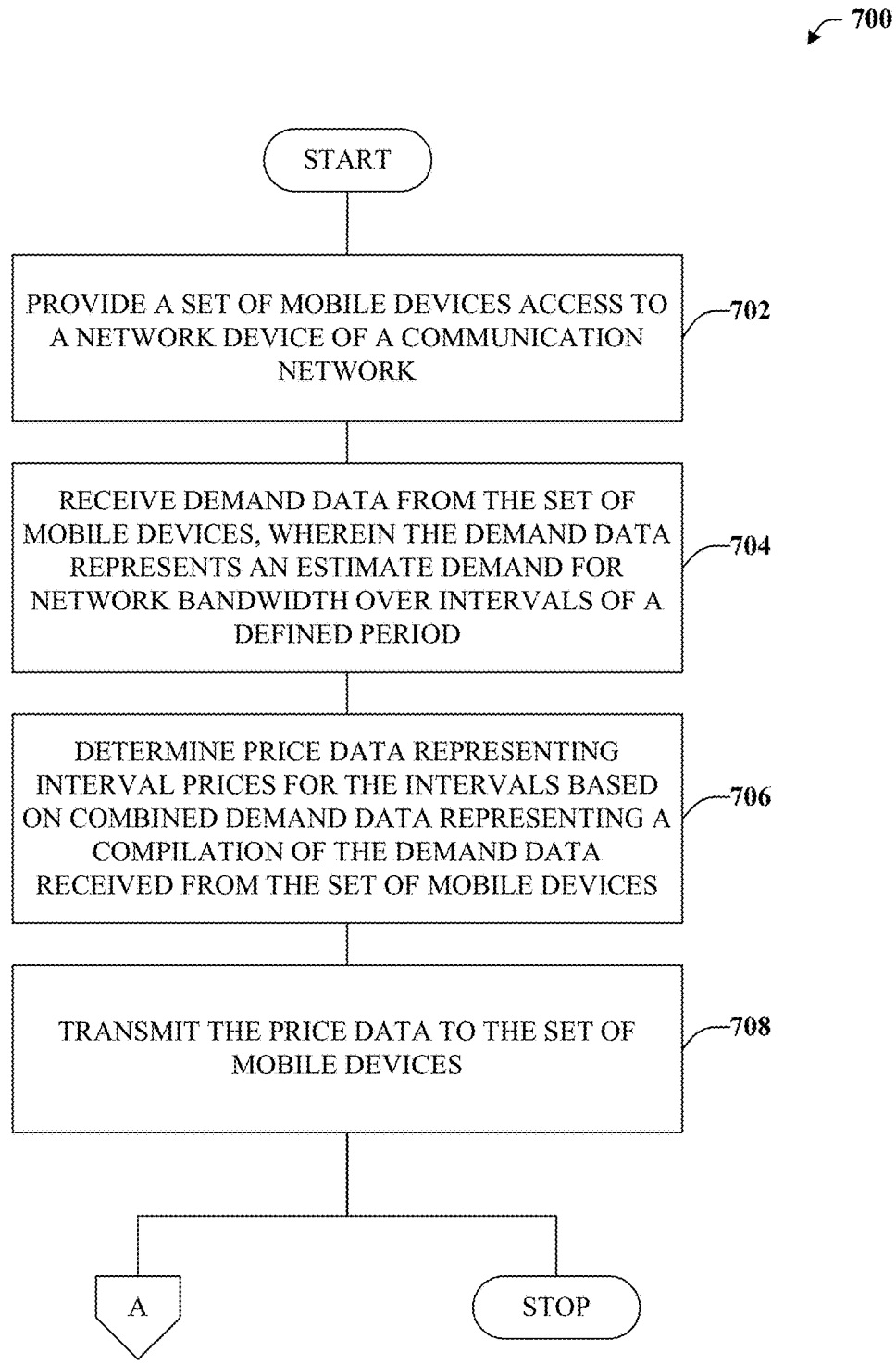
FIG. 7 illustrates an example methodology that can provide for computing a price for last hop data traffic in a cellular communication network based on estimated demand from multiple user equipment devices in accordance with certain embodiments of this disclosure.
Figure 8:
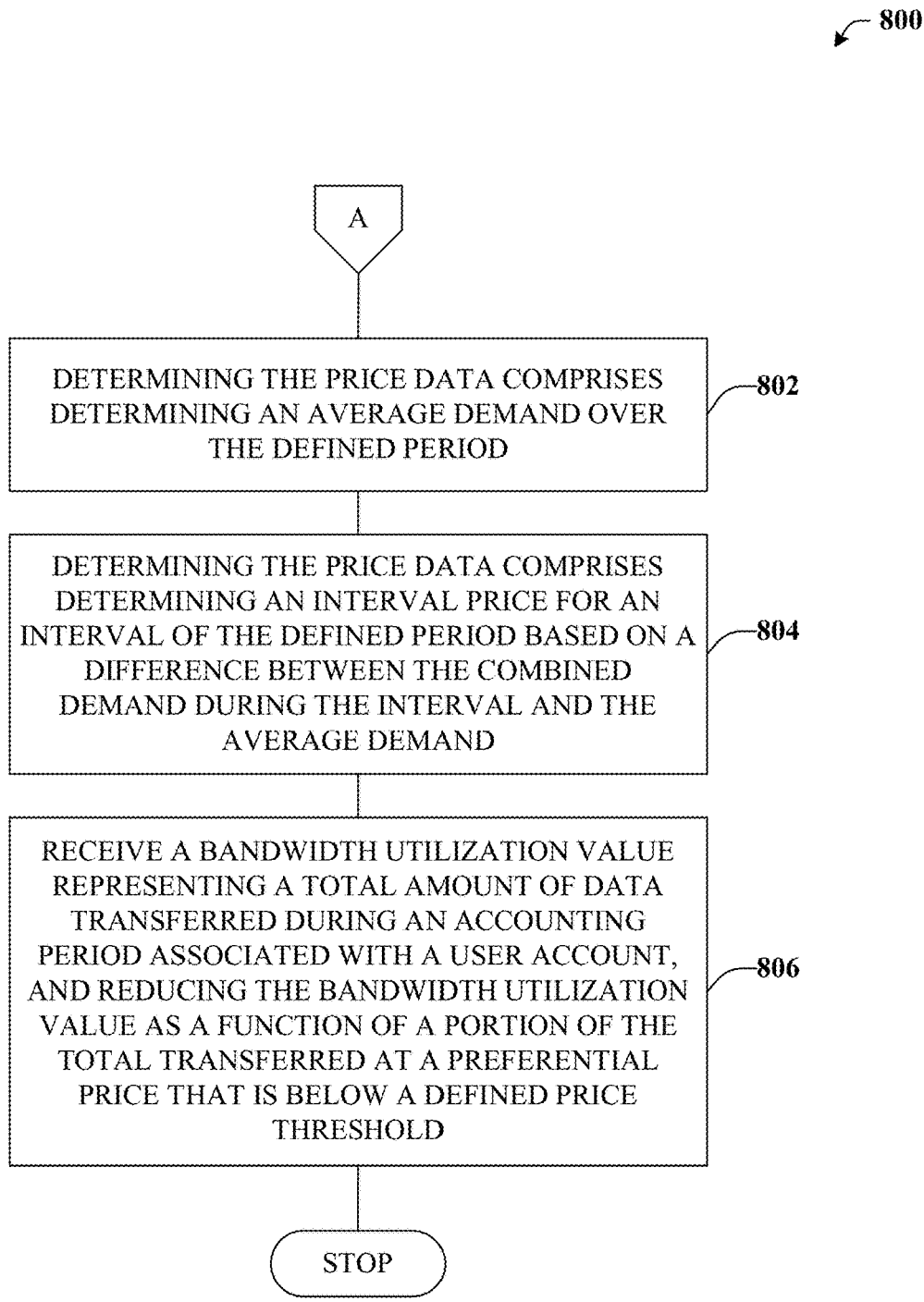
FIG. 8 illustrates an example methodology that can provide for additional features or aspects in connection with computing a price for last hop data traffic in a cellular communication network based on estimated demand from multiple user equipment devices in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can provide for computing a price for last hop data traffic in a cellular communication network based on estimated demand from multiple user equipment devices. For example, at reference numeral 702, access to a network device of a communication network can be provided to a set of mobile devices (e.g., user equipment). The network device can be, e.g., a gateway device located in a core network portion of the communication network, access to which can be provided by an access point device such as an eNodeB of the communication network.

At reference numeral 704, demand data can be received from the set of mobile devices. The demand data can represent an estimated demand for network bandwidth over intervals of a defined period. Various mobile devices from the set can provide distinct demand data corresponding to the operation of the associated device.

At reference numeral 706, price data representing interval prices for the intervals can be determined. Determination of the price data can be based on combined demand data representing a compilation of the demand data received from the set of mobile devices. As an example, intervals for which the combined demand data estimates high demand (e.g., demand that constitutes above average throughput) can be assigned higher prices than intervals for which that is not the case. At reference numeral 708, the price data can be transmitted to the set of mobile devices.

Turning now to FIG. 8, exemplary method 800 is illustrated. Method 800 can provide for additional features or aspects in connection with computing a price for last hop data traffic in a cellular communication network based on estimated demand from multiple user equipment devices. For example, method 800 can initially proceed to reference numeral 802. At reference numeral 802, the determining the price data detailed at reference numeral 706 of FIG. 7 can be determined based on an average demand over the defined period. This average demand can be any type of suitable average, such as a moving average, mean average, medium average, and so forth.

At reference numeral 804, the determining the price data can comprise determining an interval price for an interval of the defined period based on a difference between the combined demand during the interval and the average demand.

At reference numeral 806, a bandwidth utilization value representing a total amount of data transferred during an accounting period (e.g., one month) associated with a user account can be received or determined. This bandwidth utilization value can be reduced as a function of a portion of the total transferred at a preferential price that is below a defined price threshold. For example, data transferred at a price associated with below average bandwidth can yield a resultant discount on the amount of accounted data transfer.

Example Operating Environments

Figure 9:
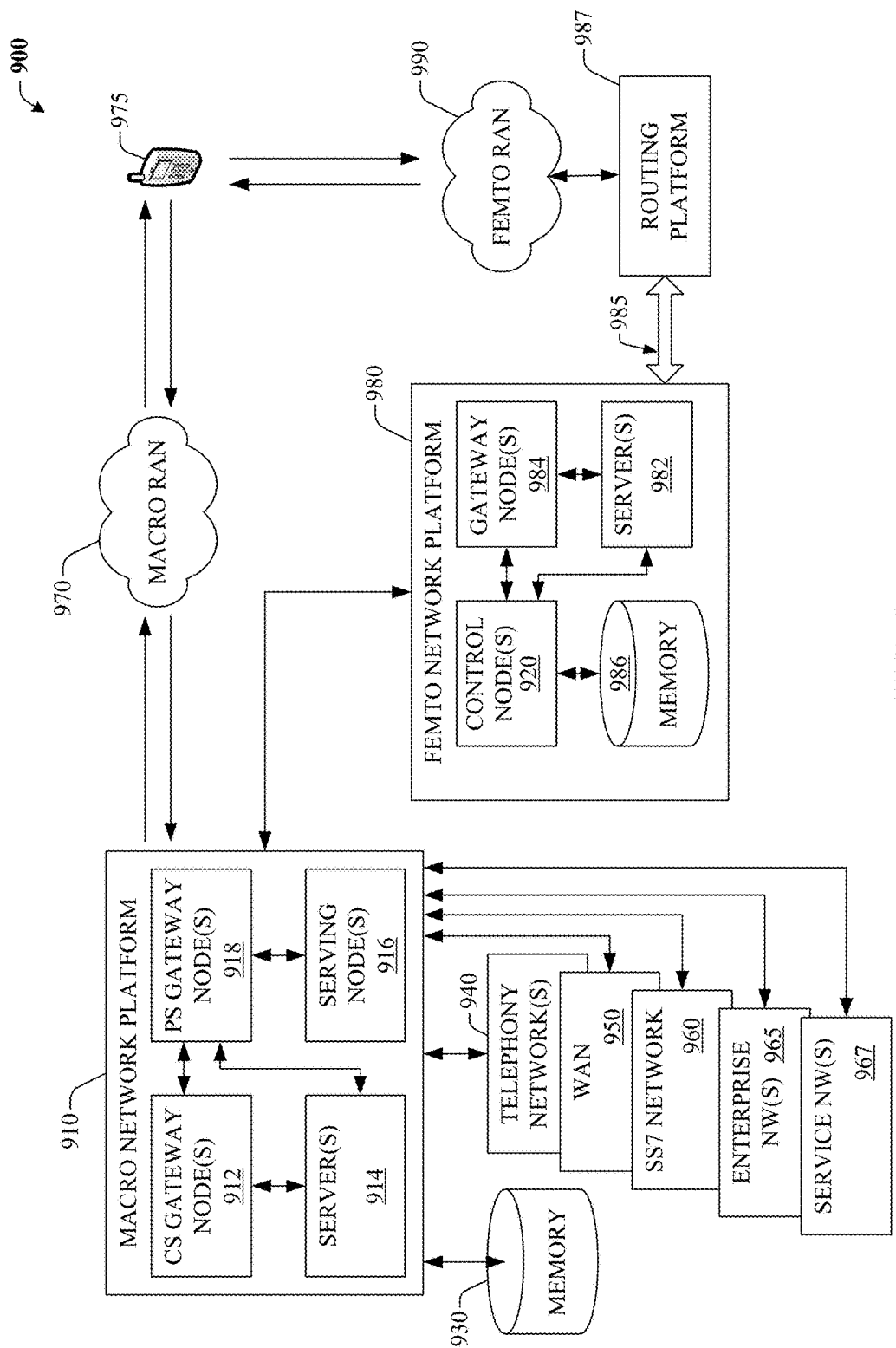
FIG. 9 illustrates a first example of a wireless communications environment with associated components that can be operable to execute certain embodiments of this disclosure.

To provide further context for various aspects of the subject specification, FIG. 9 illustrates an example wireless communication environment 900, with associated components that can enable operation of a femtocell enterprise network in accordance with aspects described herein. Wireless communication environment 900 comprises two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 910 via backhaul pipe(s) 985. It should be appreciated that femto network platform 980 typically offloads UE 975 from macro network, once UE 975 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 970 can comprise various coverage cells, while femto RAN 990 can comprise multiple femto access points or multiple metro cell access points. As mentioned above, it is to be appreciated that deployment density in femto RAN 990 can be substantially higher than in macro RAN 970.

Generally, both macro and femto network platforms 910 and 980 comprise components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 comprises CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can comprise traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also comprises serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can comprise one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also comprise substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based) it generates in addition to data received from macro network platform 910. It is to be noted that server(s) 982 can comprise one or more processor configured to confer at least in part the functionality of macro network platform 910. To that end, the one or more processor can execute code instructions stored in memory 986, for example.

Memory 986 can comprise information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
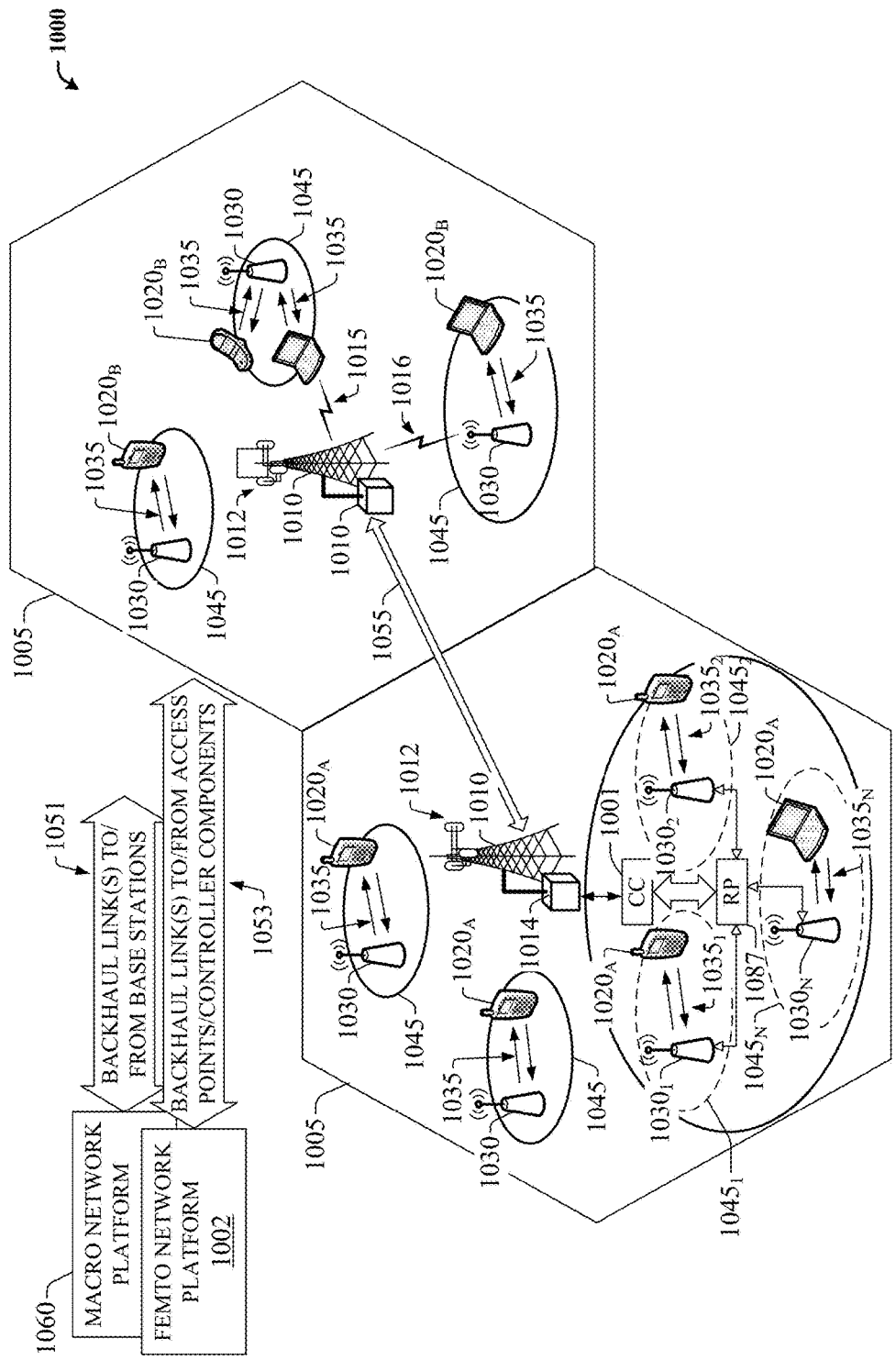
FIG. 10 illustrates a second example of a wireless communications environment with associated components that can be operable to execute certain embodiments of this disclosure.

FIG. 10 illustrates a wireless environment that comprises macro cells and femtocells for wireless coverage in accordance with aspects described herein. In wireless environment 1005, two areas represent "macro" cell coverage; each macro cell is served by a base station 1010. It can be appreciated that macro cell coverage area 1005 and base station 1010 can comprise functionality, as more fully described herein, for example, with regard to system 1000. Macro coverage is generally intended to serve mobile wireless devices, like UE 1020$_A$, 1020$_B$, in outdoors locations. An over-the-air (OTA) wireless link 1035 provides such coverage, the wireless link 1035 comprises a downlink (DL) and an uplink (UL), and utilizes a predetermined band, licensed or unlicensed, of the radio frequency (RF) spectrum. As an example, UE 1020$_A$, 1020$_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform 1060; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs 1020$_A$ can be routed by the RP 1087, for example, internally, to another UE 1020$_A$ connected to a disparate femto AP connected to the RP 1087, or, externally, to the femto network platform 1002 via the CC 1001, as discussed in detail supra.

In wireless environment 1005, within one or more macro cell(s) 1005, a set of femtocells 1045 served by respective femto access points (APs) 1030 can be deployed. It can be appreciated that, aspects of the subject innovation can be geared to femtocell deployments with substantive femto AP density, e.g., $10^4$-$10^7$ femto APs 1030 per base station 1010. According to an aspect, a set of femto access points 1030$_1$-1030$_N$, with N a natural number, can be functionally connected to a routing platform 1087, which can be functionally coupled to a controller component 1001. The controller component 1001 can be operationally linked to the femto network platform 1002 by employing backhaul link(s) 1053. Accordingly, UE 1020$_A$ connected to femto APs 1030$_1$-1030$_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 10, in example embodiment 1000, base station AP 1010 can receive and transmit signal(s) (e.g., traffic and control signals) from and to wireless devices, access terminals, wireless ports and routers, etc., through a set of antennas 1012$_1$-1012$_N$. It should be appreciated that while antennas 1012$_1$-1012$_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 comprises a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (PDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Figure 11:
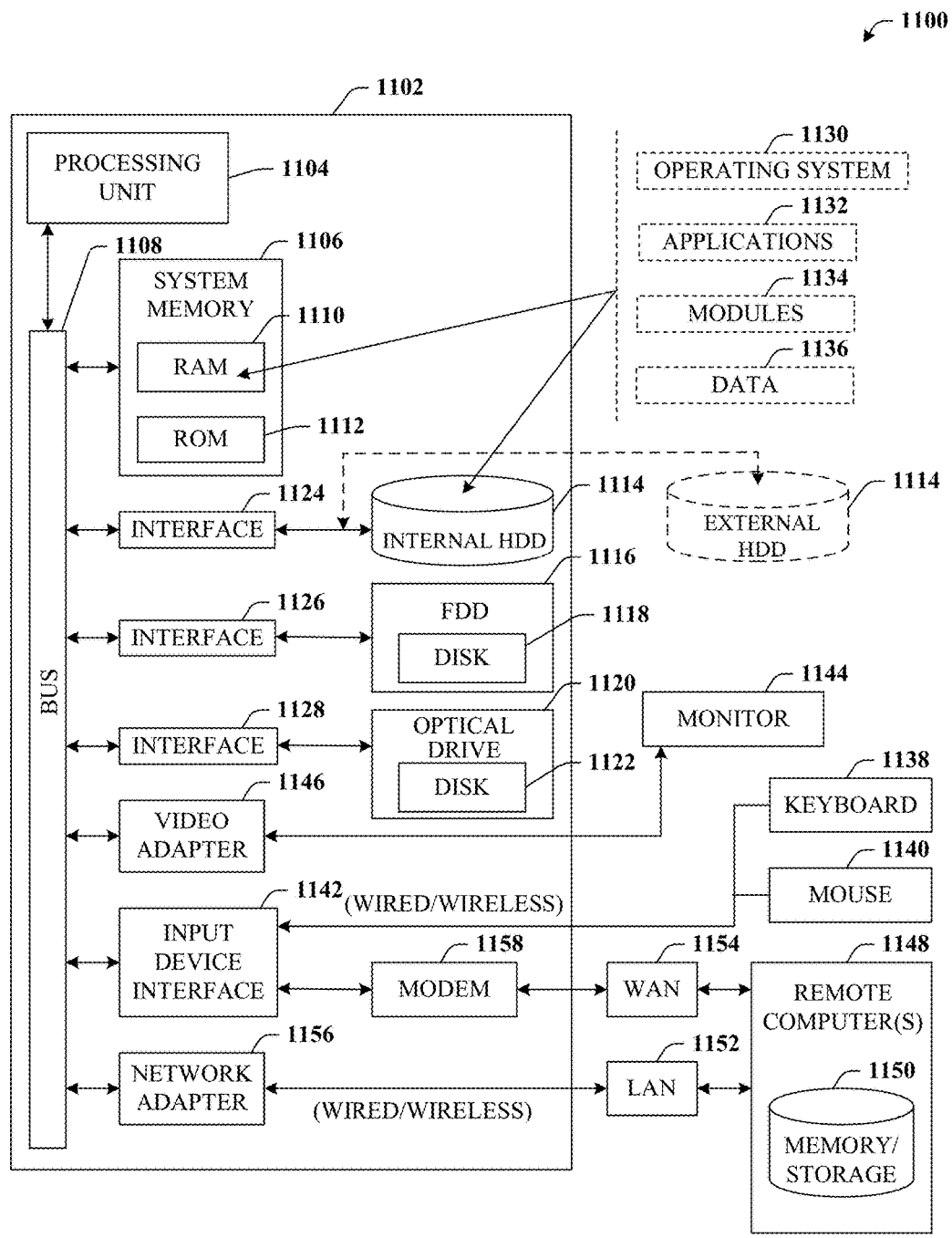
FIG. 11 illustrates an example block diagram of a computer operable to execute certain embodiments of this disclosure.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 11, the exemplary environment 1100 for implementing various aspects of the disclosed subject matter comprises a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may comprise a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically comprises other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. An access point device, comprising:
   a processor; and
   a memory that stores executable instructions that, when executed by the processor, performs operations, comprising:
     providing a group of mobile devices access to a network device of a communication network of the access point device, wherein the group of mobile devices comprises a first mobile device and a second mobile device that differs from the first mobile device;
     receiving first data from the first mobile device, wherein the first data comprises: first demand data representative of a first projected demand, by the first mobile device, for bandwidth over a defined interval of time, and first priority data representative of a first priority assigned by the first mobile device to the first projected demand for bandwidth during the defined interval of time;
     receiving second data from the second mobile device, wherein the second data comprises: second demand data representative of a second projected demand, by the second mobile device, for bandwidth over the defined interval of time, and second priority data representative of a second priority assigned by the second mobile device to the second projected demand for bandwidth during the defined interval of time;
     determining aggregate demand data comprising an aggregation of the first demand data and the second demand data, wherein the aggregate demand data is indicative of aggregate projected demand, by the group of mobile devices, over the defined interval of time; and
     transmitting the aggregate demand data to the group of mobile devices.

2. The access point device of claim 1, wherein the defined interval of time is approximately one second to approximately five seconds.

3. The access point device of claim 1, wherein the defined interval of time is a first interval, and wherein the first data further comprises third projected demand for bandwidth over a group of intervals comprising the first interval and a second interval.

4. The access point device of claim 3, wherein the determining the aggregate demand date comprises determining average demand data representative of an average demand for bandwidth over the group of intervals.

5. The access point device of claim 4, wherein the determining the aggregate demand data comprises generating peak indicator data that indicates a high demand interval of the group of intervals has a demand for bandwidth that is greater than the average demand and further indicates the high demand interval represents a candidate interval from which to shift projected demand.

6. The access point device of claim 5, wherein the determining the aggregate demand data comprises determining the candidate interval further as a function of a priority of the high demand interval.

7. The access point device of claim 4, wherein the determining the aggregate demand data comprises generating trough indicator data that indicates a low demand interval of the group of intervals has a demand for bandwidth that is less than the average demand and further indicates the low demand interval represents a candidate interval to which to shift projected demand.

8. The access point device of claim 7, wherein the determining the aggregate demand data comprises determining the candidate interval further as a function of a priority of the low demand interval.

9. A mobile device, comprising:
   a processor; and
   a memory that stores executable instructions that, when executed by the processor, perform operations, comprising:
     determining first demand data representative of a projected demand for bandwidth over a defined interval of time;
     determining priority data representative of a degree of importance assigned to the projected demand for bandwidth over the defined interval;
     transmitting first data comprising the first demand data and the priority data to an access point device that provides access to a network device of a communication network;
     receiving, from the access point device, aggregate demand data comprising an aggregation of the first demand data and second demand data of a second mobile device served by the access point device during the defined interval; and
     modifying bandwidth utilization during the defined interval based on the aggregate demand data.

10. The mobile device of claim 9, wherein the defined interval has a duration that is approximately one second to approximately five seconds.

11. The mobile device of claim 9, wherein the defined interval of time is a first interval, and wherein the determining the first demand data comprises respectively determining projected demands for bandwidth over a group of intervals comprising the first interval and a second interval.

12. The mobile device of claim 11, wherein the determining the priority data comprises respectively determining degrees of importance assigned to projected demands for bandwidth over the first interval and the second interval.

13. The mobile device of claim 9, wherein the projected demand for bandwidth relates to streaming video data and the priority data is determined as a function of a capacity of a data buffer associated with the streaming video data.

14. The mobile device of claim 9, wherein the projected demand for bandwidth relates to network browser data and the priority data is determined as a function of whether the network browser data comprises an off-screen element that is not represented in a current viewable presentation.

15. The mobile device of claim 9, wherein the modifying the bandwidth utilization comprises shifting data traffic of the projected demand from the defined interval as a function of the priority data and the aggregate demand data.

16. The mobile device of claim 9, wherein the modifying the bandwidth utilization comprises shifting data traffic of the projected demand to the defined interval as a function of the priority data and the aggregate demand data.

17. A method, comprising:
facilitating, by a system comprising a processor, access by mobile devices to a network device of a communication network;
receiving, by the system, first data from the mobile devices, wherein the first data comprises demand data representative of projected demand for bandwidth over a defined interval of time and priority data representative of a priority assigned to the projected demand for bandwidth;
determining, by the system, aggregate data representing a combined projected demand for bandwidth over the defined interval of time by the mobile devices; and
transmitting, by the system, the aggregate data to the mobile devices.

18. The method of claim 17, wherein the determining the aggregate data comprises determining average demand data representative of a mean average of demand per interval over a group of intervals comprising the defined interval.

19. The method of claim 18, further comprising determining, by the system, peak-to-average data representative of a difference between the mean average of demand per interval and the projected demand for bandwidth over the defined interval.

20. The method of claim 17, wherein the determining the aggregate data comprises determining the aggregate data as a function of the priority data.

* * * * *